(12) United States Patent
Komateedi et al.

(10) Patent No.: US 11,344,875 B2
(45) Date of Patent: May 31, 2022

(54) NOX-TRAPPING CATALYST HAVING NON-PLATINUM-GROUP-METAL NOX-TRAPPING LAYER

(71) Applicant: Heesung Catalysts Corporation, Gyeonggi-do (KR)

(72) Inventors: Narayana Rao Komateedi, Gyeonggi-do (KR); Jin-Woo Song, Incheon (KR)

(73) Assignee: HEESUNG CATALYSTS CORPORATION, Gyeonggi-do (KR)

( * ) Notice: Subject to any disclaimer, the term of this patent is extended or adjusted under 35 U.S.C. 154(b) by 113 days.

(21) Appl. No.: 16/642,167

(22) PCT Filed: Aug. 14, 2018

(86) PCT No.: PCT/KR2018/009320
§ 371 (c)(1),
(2) Date: Feb. 26, 2020

(87) PCT Pub. No.: WO2019/045324
PCT Pub. Date: Mar. 7, 2019

(65) Prior Publication Data
US 2021/0069690 A1 Mar. 11, 2021

(30) Foreign Application Priority Data
Aug. 28, 2017 (KR) .................. 10-2017-0108380

(51) Int. Cl.
*B01J 21/04* (2006.01)
*B01J 23/656* (2006.01)
(Continued)

(52) U.S. Cl.
CPC .......... *B01J 37/0244* (2013.01); *B01J 21/04* (2013.01); *B01J 23/6562* (2013.01);
(Continued)

(58) Field of Classification Search
CPC .... B01J 21/04; B01J 23/6562; B01J 37/0244; B01J 35/0006; F01N 3/0842; F01N 3/10
See application file for complete search history.

(56) References Cited

U.S. PATENT DOCUMENTS 5,837,212 A  11/1998 Hepburn et al.
6,777,370 B2 *  8/2004 Chen ................. B01J 23/58
                                          502/241
(Continued)

FOREIGN PATENT DOCUMENTS

JP  2006512534 A  4/2006
JP  2017512279 A  5/2017
(Continued)

OTHER PUBLICATIONS

International Search Report and Written Opinion were dated Dec. 10, 2018 by the International Searching Authority for International Application No. PCT/KR2018/009320, filed on Aug. 14, 2018 and published as WO 2019/045324 on Mar. 7, 2019 (Applicant—Heesung Catalysts Corporation) (9 Pages).

(Continued)

*Primary Examiner* — Cam N. Nguyen
(74) *Attorney, Agent, or Firm* — Ballard Spahr LLP

(57) ABSTRACT

Disclosed is a NOx-trapping catalyst having a non-platinum-group-metal NOx-trapping layer, which contains a transition metal, particularly manganese, able to maintain NOx-trapping performance while decreasing the amount of expensive platinum-group metal.

13 Claims, 3 Drawing Sheets

Multilayer w/ PGM

Single slurry

(51) Int. Cl.
  *B01J 35/00* (2006.01)
  *B01J 37/02* (2006.01)
  *F01N 3/08* (2006.01)
  *F01N 3/10* (2006.01)

(52) U.S. Cl.
  CPC ........ *B01J 35/0006* (2013.01); *F01N 3/0842* (2013.01); *F01N 3/101* (2013.01); *B01J 2523/00* (2013.01); *F01N 2510/0684* (2013.01)

(56) References Cited

U.S. PATENT DOCUMENTS

| | | | |
|---|---|---|---|
| 6,923,945 B2 * | 8/2005 | Chen | B01J 23/58 423/239.1 |
| 6,930,073 B2 * | 8/2005 | Dou | B01D 53/945 502/328 |
| 7,276,212 B2 * | 10/2007 | Hu | B01J 23/63 422/177 |
| 7,329,629 B2 * | 2/2008 | Gandhi | B01J 37/0244 502/325 |
| 7,490,464 B2 * | 2/2009 | Li | B01D 53/9459 60/297 |
| 7,811,962 B2 * | 10/2010 | Hu | B01J 37/0244 502/304 |
| 7,919,051 B2 * | 4/2011 | Li | F01N 13/0093 422/171 |
| 8,475,752 B2 * | 7/2013 | Wan | F01N 3/0821 423/213.2 |
| 8,592,337 B2 * | 11/2013 | Hilgendorff | B01J 37/0045 502/304 |
| 8,741,242 B2 * | 6/2014 | Cooper | B01J 23/63 423/213.5 |
| 8,784,759 B2 * | 7/2014 | Hilgendorff | B01J 37/0036 423/213.5 |
| 9,242,242 B2 * | 1/2016 | Hilgendorff | B01J 37/0248 |
| 9,266,092 B2 * | 2/2016 | Arnold | B01J 37/0244 |
| 10,428,708 B2 * | 10/2019 | Utschig | F01N 3/0842 |
| 10,443,463 B2 * | 10/2019 | Hoyer | B01J 23/10 |
| 2001/0036432 A1 * | 11/2001 | Hu | B01J 23/58 502/328 |
| 2005/0164879 A1 * | 7/2005 | Chen | B01J 23/58 502/328 |
| 2008/0016857 A1 * | 1/2008 | Hu | B01J 23/63 60/299 |
| 2008/0120970 A1 * | 5/2008 | Hilgendorff | B01D 53/9422 60/299 |
| 2015/0240752 A1 | 8/2015 | Chandler et al. | |
| 2015/0352495 A1 * | 12/2015 | Hoyer | B01D 53/9422 423/213.5 |
| 2017/0362984 A1 * | 12/2017 | Li | B01J 35/04 |
| 2018/0195425 A1 * | 7/2018 | Li | B01J 37/0205 |
| 2020/0156046 A1 * | 5/2020 | Yuejin | B01D 53/9422 |

FOREIGN PATENT DOCUMENTS

| | | |
|---|---|---|
| KR | 20030028121 A | 4/2003 |
| KR | 20030095675 A | 12/2003 |
| KR | 20050093531 A | 9/2005 |
| KR | 20070006315 A | 1/2007 |
| KR | 20110025848 A | 3/2011 |
| WO | WO 2004/030798 A1 | 4/2004 |
| WO | WO 2009/158453 A1 | 12/2009 |
| WO | WO 2019/045324 A1 | 3/2019 |

OTHER PUBLICATIONS

Castoldia, L. et al., "Silver-based catalytic materials for the simultaneous removal of soot and NOx", Catalysis Today, 2015, vol. 258, pp. 405-415.

* cited by examiner

[Fig. 1]
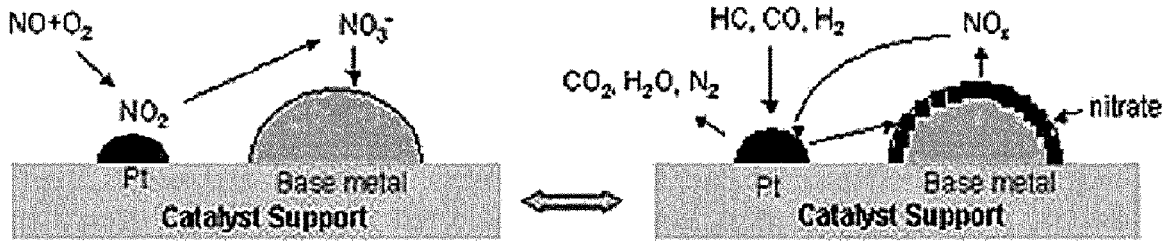
Lean Operation (NOx Trapping)   Rich Transient (Reduce Stored NOx)
[Fig. 2]
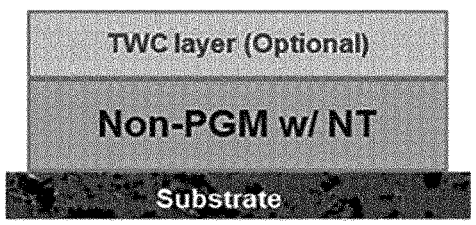 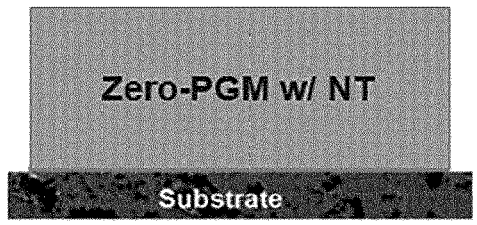
Multilayer w/ PGM   Single slurry
[Fig. 3]
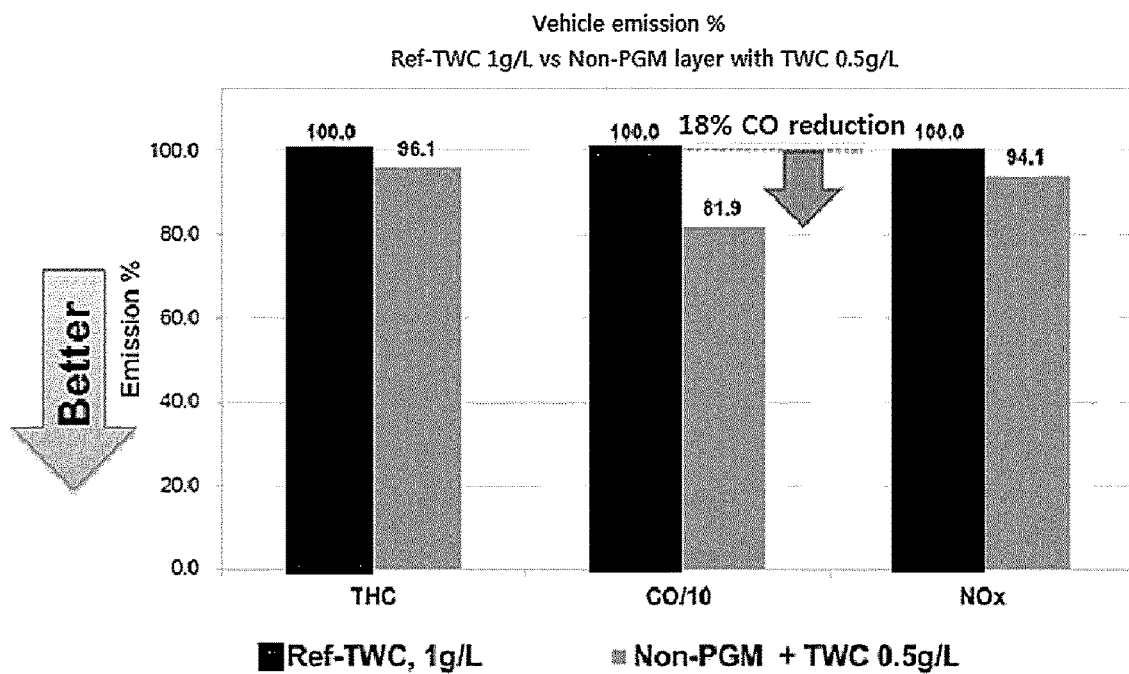

[Fig. 4]
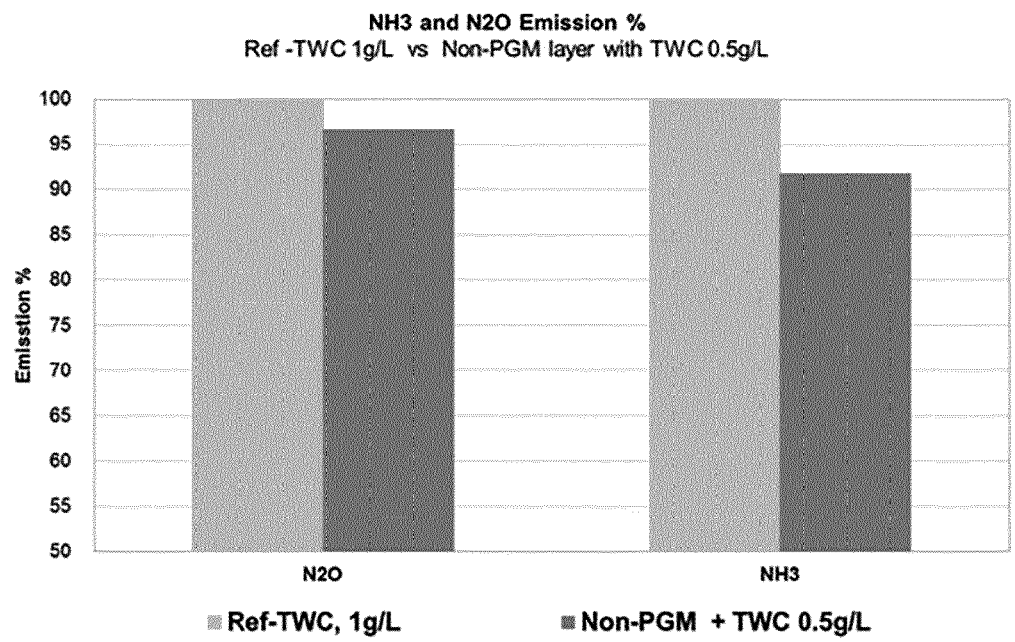

[Fig. 5]
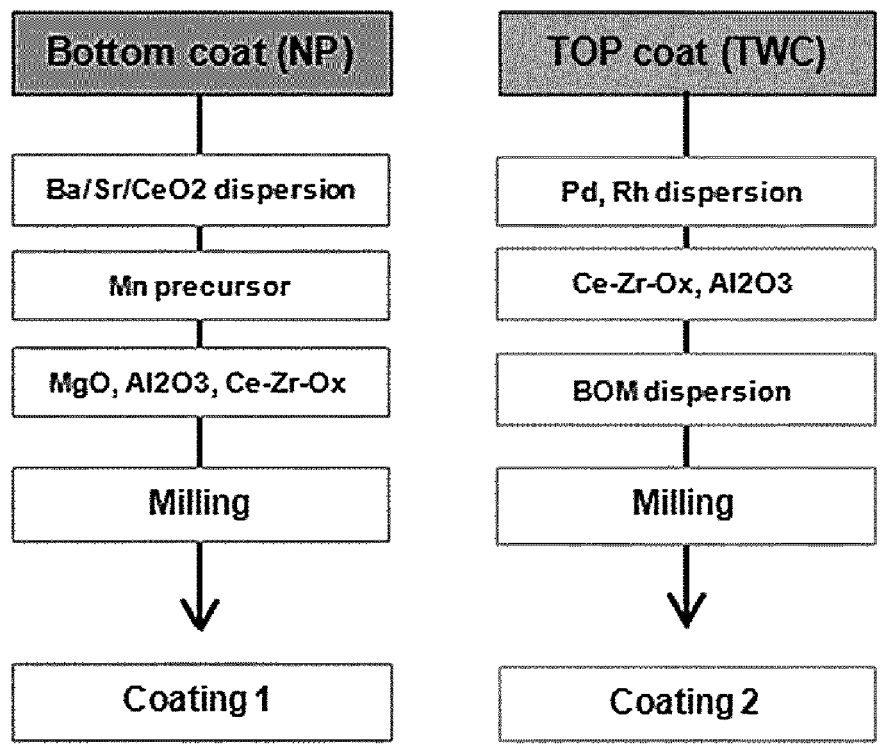
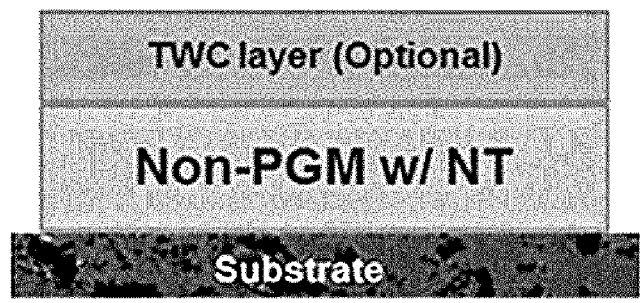

NOX-TRAPPING CATALYST HAVING NON-PLATINUM-GROUP-METAL NOX-TRAPPING LAYER

CROSS-REFERENCE TO RELATED APPLICATIONS

This application is a U.S. National Phase Application of International Application No. PCT/KR2018/009320, filed Aug. 14, 2018, which claims priority to Korean Application No. 10-2017-0108380, filed Aug. 28, 2017, each of which are hereby incorporated by reference in their entirety.

TECHNICAL FIELD

The present invention relates to a NOx-trapping catalyst having a non-platinum-group-metal (non-PGM or zero-PGM) NOx-trapping layer and, more particularly, to a NOx-trapping catalyst having a non-platinum-group-metal NOx-trapping layer, which contains a transition metal, particularly manganese, able to maintain NOx-trapping performance while decreasing the amount of expensive platinum-group metal.

BACKGROUND ART

The generation of carbon dioxide is currently inevitable upon combustion using internal combustion engines, and thus the use of a diesel engine or a gasoline lean-burn engine, which operates such that carbon dioxide is generated in as small an amount as possible and is able to realize fuel savings, is actively increasing.

However, the case where the diesel engine or the lean-burn engine is used is problematic because NOx may be emitted upon operation under a lean environment. Hence, there is a need to trap NOx from exhaust gas under lean-burn engine operation conditions and to emit and reduce NOx under stoichiometric or rich engine operation conditions.

According to the present invention, a NOx-trapping catalyst is based on a three-way catalyst (TWC), and the terms "NOx-trapping catalyst" and "three-way catalyst" may be interchangeably used herein. As described in the art, the three-way catalyst having a NOx-trapping function may be provided in the form of a single-layer structure or a multi-layer structure comprising a three-way catalyst layer containing a platinum element and a NOx-trapping layer containing a platinum element.

The NOx-trapping catalyst works through a series of fundamental steps, as represented by Reaction Schemes 1 to 5 below. Typically, a NOx-trapping catalyst has to possess both oxidation and reduction activities. In an oxidation environment, NO is oxidized into $NO_2$ (Reaction Scheme 1), which is important in the storage of NOx. For reaction at low temperatures, a noble metal, for example, Pt, is used as a catalyst. The subsequent oxidation procedure continues, and $NO_2$ is further oxidized into a nitrate to thus incorporate an oxygen atom, which is considered a catalytic reaction (Reaction Scheme 2). The noble metal is responsible for both oxidation and reduction reactions, and upon the reduction reaction, Pt is first responsible for a catalytic action for emitting NOx using a reducing agent such as CO (carbon monoxide) or HC (hydrogen carbide) (Reaction Scheme 3). Subsequently, the emitted NOx is reduced into $N_2$ gas in a rich environment (Reaction Schemes 4 and 5). NOx emission may be caused by the injection of fuel even under pure oxidation conditions. However, in order to efficiently reduce the emitted NOx using CO, a rich state is required. NOx emission may also occur through a rapid increase in the temperature. This is because a base-metal nitrate is less stable at high temperatures. The NOx-trapping catalyst works cyclically. The base-metal compound is considered to undergo carbonate/nitrate conversion as the dominant path during lean/rich operation thereof.

Oxidation of NO into $NO_2$ $$NO + \tfrac{1}{2}O_2 \rightarrow NO_2 \qquad \text{[Reaction Scheme 1]}$$

Storage of NOx as nitrate $$2NO_2 + MCO_3 + \tfrac{1}{2}O_2 \rightarrow M(NO_3)_2 + CO_2 \qquad \text{[Reaction Scheme 2]}$$

Emission of NOx $$M(NO_3)_2 + 2CO \rightarrow MCO_3 + NO_2 + NO + CO_2 \qquad \text{[Reaction Scheme 3]}$$

Reduction of NOx into $N_2$ $$NO_2 + CO \rightarrow NO + CO_2 \qquad \text{[Reaction Scheme 4]}$$

$$2NO + 2CO \rightarrow N_2 + 2CO_2 \qquad \text{[Reaction Scheme 5]}$$

In Reaction Schemes 2 and 3, M is a divalent base metal cation, and preferably Ba, but may include an alkaline earth metal such as Mg, Sr, etc., which is referred to as an "NOx-trapping or adsorption material".

DISCLOSURE OF INVENTION

Technical Problem

Currently, many attempts have been made to decrease the amount of expensive platinum-group metal in a three-way catalyst. Also, in order to realize optimal NOx-trapping activity, as shown in FIG. 1, NOx adsorbed and stored in lean atmosphere and NOx desorption followed by NOx reduction occurs at rich atmosphere. However, currently available NOx-trapping materials required platinum-group metals to store decent amount of NOx, in addition weakly resistant to heat, and the NOx storage capability thereof may decrease notably upon exposure to high temperatures.

Accordingly, the present invention is intended to provide a NOx-trapping catalyst layer without platinum-group metal, which is stable at high temperatures. Further the amount of platinum-group metal in the NOx-trapping catalyst system was remarkably decreased up to 90% in the total constitution thereof.

Solution to Problem

Therefore, the present invention provides a NOx-trapping catalyst, which is stable at high temperatures and in which the amount of platinum-group metal is remarkably decreased in the total constitution thereof. Particularly, a NOx-trapping layer is a non-PGM NOx-trapping layer, and the NOx-trapping layer contains no platinum-group element. The NOx-trapping layer is configured to include a NOx-trapping material, an oxygen storage capacity (OSC) material, and alumina ($Al_2O_3$) as a stabilizer, which are doped with manganese. Moreover, the NOx-trapping layer includes no copper (Cu).

BRIEF DESCRIPTION OF DRAWINGS

FIG. 1 schematically shows the NOx-trapping function;

FIG. 2 schematically shows a double-layer NOx-trapping catalyst and a single-layer NOx-trapping catalyst according to the present invention;

FIG. 3 shows the performance of the double-layer NOx-trapping catalyst with 50% lower platinum-group metal according to the present invention and a conventional TWC catalyst system;

FIG. 4 shows the results of emission of ammonia and $N_2O$ by the double-layer NOx-trapping catalyst according to the present invention and the conventional TWC catalyst system; and FIG. 5 schematically shows a process of preparing a NOx-trapping catalyst according to the present invention.

MODE FOR THE INVENTION

The present invention addresses a three-way catalyst or NOx-trapping catalyst having NOx adsorption activity, which is configured as a multilayer structure, comprising a three-way catalyst layer containing a platinum-group element and a NOx-trapping layer configured to include a NOx-trapping material and an oxygen storage capacity material, which are doped with a transition metal, without any platinum-group element (non-PGM or zero-PGM). For the sake of brevity of description, the NOx-trapping catalyst is exemplified in the form of a two-layer structure, but a single-layer structure comprising a three-way catalyst component and a trapping component, which are mixed together, may be realized. As used herein, the term "platinum-group element" refers to at least one metal selected from among platinum, palladium, rhodium, ruthenium, iridium and osmium.

In the present invention, the trapping layer of the three-way catalyst having NOx adsorption activity is configured to include a NOx-trapping material, an oxygen storage capacity material and a stabilizer, which are doped with a transition metal. The transition metal, such as manganese, nickel or silver, may be contained in an amount of 10 to 50 wt % based on the total weight of the trapping layer. The NOx-trapping material includes an oxide of an alkaline earth metal such as Ba, Mg, or Sr, and the oxygen storage capacity material includes a rare earth metal oxide, such as Ce, Zr, La, Pr or Nd oxide. In the present invention, the stabilizer may be alumina. The trapping layer of the present invention may also include an additional component comprising a NOx-trapping material and an oxygen storage capacity material, which are not doped with a transition metal (hereinafter, referred to as an "assistant component").

In the present invention, the three-way catalyst having NOx adsorption activity includes a three-way catalyst layer, and a conventional three-way catalyst layer contains a platinum-group element selected from among platinum, palladium and rhodium. The amount of the platinum-group element could be reduced by 50 to 90 wt % compared to conventional three-way catalysts. In the present invention, the three-way catalyst having NOx adsorption activity becomes stable at high temperatures ranging from 850° C. to 1050° C. and thus the NOx storage capability thereof may be remarkably increased compared to conventional NOx trapping catalyst.

Hereinafter, a detailed description will be given of the present invention.

According to the present invention, the three-way catalyst having NOx adsorption activity is featured in that the NOx-trapping or adsorption layer contains no platinum-group element, and the NOx-trapping layer (or adsorption layer) is configured to include a NOx-trapping material and an oxygen storage capacity material, which are doped with a transition metal, without any platinum-group element. In the present invention, the transition metal, which enables the oxidation and reduction functions to simultaneously occur, is selected from among manganese, nickel and silver, with the exception of copper, which may be used alone or in combination, and particularly useful is manganese. Such a transition metal is introduced to the NOx-trapping material, the oxygen storage capacity material and alumina. Preferably, the NOx-trapping material is an oxide of a metal selected from the group consisting of barium, strontium and magnesium, and is preferably magnesium oxide, and the oxygen storage capacity material is Ce, La, Pr or Nd oxide, and is preferably $CeO_2$. The amount of transition metal that is introduced may be 10 to 50 wt % based on the total weight of the trapping layer. Also, an assistant component for further promoting NOx adsorption activity may be contained, and preferably, a complex metal oxide or a mixture of barium oxide and strontium oxide is introduced to ceria or alumina.

In the present invention, the NOx adsorption layer has overcome the limitations with conventional NOx adsorption components. Specifically, stability to heat, which is the problem with conventional NOx-trapping components, is increased to thus maintain NOx storage capability upon exposure to high temperatures. The catalyst of the invention containing no expensive platinum-group element exhibits catalytic performance equivalent to that of a conventional catalyst containing a platinum-group element for NOx-trapping performance.

In the present invention, the NOx adsorption layer contains no platinum element. As shown in FIG. 1, the platinum-group element in the conventional NOx adsorption layer functions to oxidize generated NO to thus be converted into $NO_2$ under lean conditions, and functions as a catalyst for converting NOx desorbed from the NOx adsorption component into carbon dioxide, water, or nitrogen under oxygen-rich (rich transient) conditions, and may include platinum alone or in combination with other platinum-group metals. A conventional platinum-group element may include any metal selected from the group consisting of palladium, rhodium, ruthenium, iridium, osmium and mixtures thereof, but the NOx adsorption layer of the present invention contains no platinum-group element. The present inventors have discovered that manganese, nickel or silver may exhibit the same function as the platinum-group element and is thus capable of replacing the platinum-group element. Such a transition metal may be introduced to a typical NOx-trapping component and an oxygen storage capacity material, such as Ce, Zr, La, Pr and Nd oxides, and preferably $CeO_2$. In particular, the present inventors have ascertained that equal or superior catalytic performance may be obtained even without the use of copper (Cu), which has conventionally been proposed as the component for promoting NOx-trapping performance in the art.

The three-way catalyst layer of the present invention is configured such that the platinum-group element is loaded on a support comprising a refractory oxide support having a large surface area. The support may include at least one selected from the group consisting of alumina, silica, titania and zirconia, and is preferably selected from the group consisting of activated alumina, silica, silica-alumina, aluminosilicate, alumina-zirconia, alumina-chromia, and alumina-ceria.

The three-way catalyst of the present invention may be prepared through a typical process in the art. With reference to the preparation process schematically shown in FIG. 5, a better understanding of the present invention will be given through the following examples, which are merely set forth to illustrate but are not to be construed as limiting the scope of the present invention.

<Example> Preparation of Double-Layer NOx-Trapping Catalyst

1) Complex Oxide A: Preparation of BaO—CeO$_2$

Barium acetate was incorporated into CeO$_2$ powder (having a surface area of 100 to 200 m$^2$/g), and was then calcined at 500 to 700° C., thus preparing a complex oxide A (BaO was loaded in an amount of 5 to 20 wt %). Here, SrO may be optionally added. The NOx-trapping layer of the present invention may further include the complex oxide A as the assistant component.

2) Complex Oxide B: Preparation of MnOx-MgO—CeO$_2$—Al$_2$O$_3$

Magnesium acetate and cerium nitrate were incorporated into Al$_2$O$_3$ and then calcined at 500 to 700° C. to give a complex oxide (the sum of CeO$_2$ and MgO to be loaded was 5 to 20 wt %), and a Mn precursor (salt) and MnOx were wet- or dry-mixed and fired, thus preparing a complex oxide B.

3) Preparation of Three-Way Catalyst Component:

A palladium precursor (salt) was incorporated into the Ce—Zr-Ox complex oxide, in which the amount of Pd to be loaded was maintained at 0.01 to 5 wt %. Subsequently, a rhodium precursor (salt) was incorporated into alumina, in which the amount of Rh to be loaded was maintained at 0.001 to 2 wt %. These were mixed to base metals like Ba, Sr, Zr, La etc to obtain top coat slurry.

The double-layer NOx-trapping catalyst was provided in the form of a two-layer structure comprising bottom and top layers.

Bottom (NOx-Trapping Layer)

The complex oxide A was dispersed in deionized water, after which the complex oxide B was added and dispersed for 20 min, thus preparing a slurry having a solid content of 30 to 45%. The particle size of the slurry was adjusted through ball milling so as to be suitable for coating a cordierite honeycomb. The cordierite honeycomb was coated with the prepared slurry, dried at 150° C. to 180° C. for about 10 min, and calcined at 530° C. to 550° C. for about 40 min, thus forming a bottom non-PGM NOx-trapping layer.

Top (Three-Way Catalyst Layer)

A cordierite honeycomb was coated with the three-way catalyst component slurry, dried at 150° C. to 180° C. for about 10 min, and calcined at 530° C. to 550° C. for about 40 min, thus forming a top three-way catalyst layer.

<Comparative Example> Preparation of NOx-Trapping Catalyst

A NOx-trapping catalyst was prepared in the same manner as in Example above, with the exception that the composition for the top layer was applied to the bottom layer in lieu of the composition for the bottom layer. Thus, the amount of noble metal of the comparative NOx-trapping catalyst is doubled compared to the catalyst of Example.

<Test Example> Measurement of Purification Rate of NOx-Trapping Catalyst (1) Catalyst Evaluation Before catalyst evaluation, the NOx-trapping catalysts of Example and Comparative Example were deteriorated. Here, the catalyst deterioration was performed at 950° C. to 1050° C. for 12 hr in an electric box furnace. After the deterioration, the catalysts were evaluated in the following mode.

Vehicle: 2.0 L, Gasoline MPI, KULEV, Emission test cycles: FTP-75.

(2) Results

As shown in FIG. 3, the catalyst of Example was significantly increased in the rates of removal of NOx, CO and THC despite the amount of the platinum-group element thereof being halved, compared to the catalyst of Comparative Example (1 g/L of platinum-group element). The emission of N$_2$O and NH$_3$ was also decreased (FIG. 4). In the similar kind other experiment 90% of platinum-group metal content was reduced by using NOx trapping layer (results not showed) and achieve similar kind of performance over state of art reference TWC system in terms of HC, CO, and NOx at FTP-75 mode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A NOx-trapping catalyst, having a two-layer structure, comprising:
    a three-way catalyst layer containing a platinum-group element; and
    a NOx-trapping layer comprising a NOx-trapping material comprising an alkaline-earth metal oxide and an oxygen storage capacity material, which are doped with manganese, nickel, silver, or a combination thereof and not doped with copper, without containing a platinum-group element.

2. The NOx-trapping catalyst of claim 1, wherein the transition metal is silver.

3. The NOx-trapping catalyst of claim 1, wherein the transition metal is manganese.

4. The NOx-trapping catalyst of claim 1, wherein the oxygen storage capacity material includes a rare-earth metal oxide.

5. The NOx-trapping catalyst of claim 1, wherein the NOx-trapping layer further includes alumina.

6. The NOx-trapping catalyst of claim 1, wherein the NOx-trapping layer further includes an assistant component comprising a NOx-trapping material comprising an alkaline-earth metal oxide and an oxygen storage capacity material, which are not doped with manganese, nickel, silver, or a combination thereof.

7. The NOx-trapping catalyst of claim 1, wherein the transition metal is nickel.

8. A NOx-trapping catalyst, having a single-layer structure, comprising:
    a three-way catalyst component containing a platinum-group element; and
    a NOx-trapping component comprising a NOx-trapping material comprising an alkaline-earth metal oxide and an oxygen storage capacity material, which are doped with manganese, nickel, silver, or a combination thereof and not doped with copper, without containing a platinum-group element,
    wherein the three-way catalyst component and the NOx-trapping component are mixed together.

9. The NOx-trapping catalyst of claim 8, wherein the NOx-trapping component further includes alumina.

10. The NOx-trapping catalyst of claim 8, wherein the NOx-trapping component further includes an assistant component comprising a NOx-trapping material comprising an alkaline-earth metal oxide and an oxygen storage capacity material, which are not doped with manganese, nickel, silver, or a combination thereof.

11. The NOx-trapping catalyst of claim 8, wherein the transition metal is nickel.

12. The NOx-trapping catalyst of claim 8, wherein the transition metal is manganese.

13. The NOx-trapping catalyst of claim 8, wherein the transition metal is silver.

* * * * *